(12) United States Patent
Shimokawa et al.

(10) Patent No.: US 12,442,427 B2
(45) Date of Patent: Oct. 14, 2025

(54) REVERSE FORCE MECHANISM

(71) Applicant: MEIDENSHA CORPORATION, Tokyo (JP)

(72) Inventors: Takuya Shimokawa, Shinagawa-ku (JP); Yuichi Nishikiori, Shinagawa-ku (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 19/116,247

(22) PCT Filed: Sep. 7, 2023

(86) PCT No.: PCT/JP2023/032595
§ 371 (c)(1),
(2) Date: Mar. 27, 2025

(87) PCT Pub. No.: WO2024/070551
PCT Pub. Date: Apr. 4, 2024

(65) Prior Publication Data
US 2025/0264143 A1 Aug. 21, 2025

(30) Foreign Application Priority Data
Sep. 28, 2022 (JP) .................................. 2022-154803

(51) Int. Cl.
*F16F 3/04* (2006.01)
*F16F 15/067* (2006.01)
*H01G 5/16* (2006.01)

(52) U.S. Cl.
CPC .............. *F16F 3/04* (2013.01); *F16F 15/067* (2013.01); *F16F 2228/063* (2013.01); *F16F 2232/08* (2013.01); *F16F 2236/04* (2013.01); *F16F 2236/06* (2013.01); *H01G 5/16* (2013.01)

(58) Field of Classification Search
CPC ............. F16F 2228/063; F16F 2236/06; F16F 2236/04
See application file for complete search history.

(56) References Cited

U.S. PATENT DOCUMENTS 3,161,812 A * 12/1964 Perry ....................... H01G 5/16
361/290
10,876,588 B2 12/2020 Saitoh

FOREIGN PATENT DOCUMENTS

CN 208169459 U 11/2018
JP 2964248 B1 * 10/1999
JP 2006-055494 A 3/2006
(Continued)

*Primary Examiner* — Melody M Burch
(74) *Attorney, Agent, or Firm* — Foley & Lardner LLP (57) ABSTRACT

A reverse force mechanism includes a main shaft, a main link, a movable shaft, an actuating link, a slider, an actuating shaft, a spring link, and a spring shaft. A reverse force spring is attached to the spring link. The spring shaft is fixed to a position a dimension away in a direction parallel to the slider from a base point on an extension of a line segment from the main shaft to the movable shaft when in an inserted state in which the movable shaft is farthest from a line connecting the main shaft and the actuating shaft. The dimension is set such that a resultant operating force is constant at a non-zero value. An angle between the actuating link and the slider is set to be variable within a range of 25° to 85° during operation.

6 Claims, 7 Drawing Sheets

(56) References Cited

FOREIGN PATENT DOCUMENTS

| | | | | |
|---|---|---|---|---|
| JP | 2007116025 A | * | 5/2007 | |
| JP | 2016522995 A | * | 8/2016 | ............... H01G 5/38 |
| JP | 6774102 B2 | | 10/2020 | |
| KR | 20100077031 A | * | 7/2010 | ............ H01G 5/019 |
| WO | WO-2017/043230 A1 | | 3/2017 | |

* cited by examiner

REVERSE FORCE MECHANISM

TECHNICAL FIELD

The present invention relates to a reverse force mechanism that is combined with a device having a positive spring constant, and has a negative spring constant to apply a force in an opposite direction (henceforth referred to as a reverse force) to a point of application of force from the device, and thereby adjusts an operating force.

BACKGROUND ART

Figure 11:
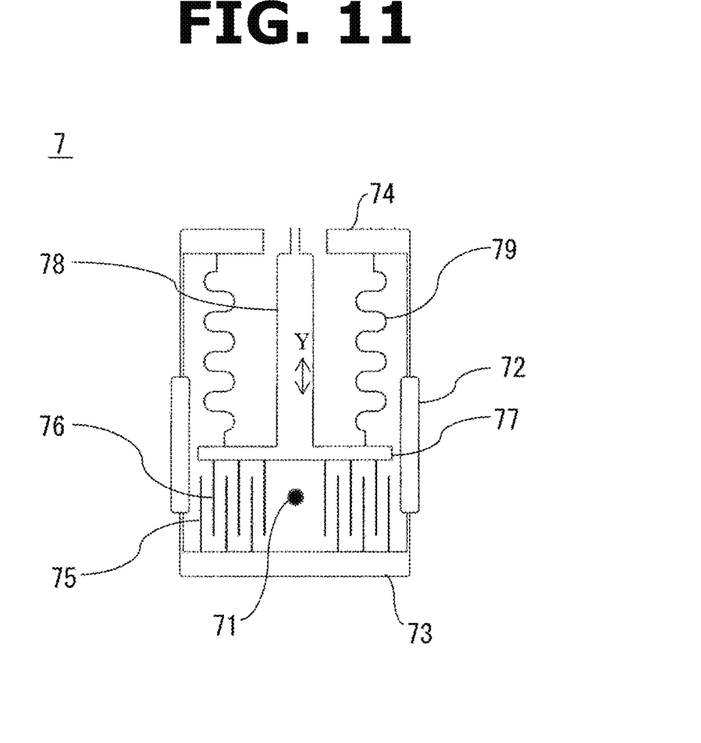
FIG. 11 is a cross-sectional view showing a conventional variable vacuum capacitor.

A variable vacuum capacitor is an example of a device having a positive spring constant. As shown in FIG. 11, a variable vacuum capacitor 7 includes: a cylindrical body (e.g., a ceramic tube) 72 including at least a nonconductive part; a fixed-side conductor 73; and a movable-side conductor 74; wherein both ends of the cylindrical body are closed by the fixed-side conductor 73 and the movable-side conductor 74 to form a vacuum vessel.

A reference numeral 75 denotes a fixed electrode disposed on an inside face of the fixed-side conductor 73 facing the vacuum vessel. The fixed electrode 75 is composed of a plurality of substantially cylindrical tubular electrode members having different inner diameters, wherein the electrode members are arranged with minute gaps therebetween.

A reference numeral 77 denotes a movable support part that supports a movable electrode 76 described below. The movable support part 77 is arranged to face the fixed-side conductor 73, and is structured to be moved in an axial direction Y of the vacuum vessel (towards both ends of the cylindrical body 72) via a movable rod 78 described below. The movable support part 77 shown in FIG. 11 has a flat plate shape extending radially of the vacuum vessel.

Similar to the fixed electrode 75, the movable electrode 76 is composed of a plurality of substantially cylindrical tubular electrode members having different inner diameters, wherein the electrode members are arranged with minute gaps therebetween. Each electrode member of the movable electrode 76 is arranged on the fixed-side conductor 73 side of the movable support part 77 to face the fixed electrode 75 so that the electrode member can be inserted in and extracted from the fixed electrode 75 without contacting the fixed electrode 75 (inserted and extracted between electrode members of the fixed electrode 75, wherein the electrode members of the movable electrode 76 and the electrode members of the fixed electrode 75 cross each other), thereby forming electrostatic capacitance between the movable electrode 76 and the fixed electrode 75.

A reference numeral 78 denotes a movable rod that extends in the axial direction Y from the backside of the movable support part 77 (from the movable-side conductor 74 side of the movable supporter part 77 where the movable electrode 76 is not arranged). In FIG. 11, the movable rod 78 is arranged to extend through the movable-side conductor 74 side of the vacuum vessel.

A reference numeral 79 denotes a bellows as a part of an electric current path of the variable vacuum capacitor 7, wherein the bellows 79 has a cylindrical shape (for example, a bellows-like shape), and is made of a flexible, thin, and soft metal. The bellows 79 is structured to allow the movable electrode 76, the movable support part 77, and the movable rod 78 to travel in the axial direction Y, while holding a space (henceforth referred to as the vacuum chamber) 71 hermetic (so as to cause a vacuum state), wherein the space 71 is radially outside the bellows 79 within the vacuum vessel, i.e. is surrounded by the cylindrical body 72, the fixed-side conductor 73, the movable-side conductor 74, the movable support part 77, and the bellows 79. Radially inside the bellows 79 (on the movable rod 78 side of the bellows 79) within the vacuum vessel, a space under atmospheric pressure (henceforth referred to as atmospheric chamber) is formed.

In this way, the fixed electrode 75 and the movable electrode 76 are arranged within the vacuum section 71 with a minute gap therebetween. The movable electrode 76 is moved in the axial direction Y by a drive source of the variable vacuum capacitor 7 via the movable rod 78 and the movable support part 77, thereby making the capacitance variable.

When the movable rod 78 is inserted or extracted, a restoring force is caused by displacement due to a spring constant 79a of the bellows 79, wherein a vacuum pressure is further applied. Accordingly, the variable vacuum capacitor 7 has an operating force characteristic having a positive spring constant in which a positive pull-in force occurs when the movable rod 78 is inserted maximally, and the pull-in force increases linearly as the movable rod 78 is extracted.

The variable vacuum capacitor 7 has a disadvantage that the operating force cannot be reduced or made constant so as to facilitate high speed operation.

In some cases, such a device having a positive spring constant is combined with a reverse force mechanism for producing a reverse force, wherein the reverse force mechanism serves as a means for adjustment of the operating force, i.e. reducing the magnitude of the operating force, or reducing the range of change of the operating force.

A patent document 1 discloses an elastic mechanism for obtaining a reverse force. The patent document 1 discloses a combination of two mechanisms, namely, a positive elasticity mechanism having a positive spring constant, and a negative elasticity mechanism having a negative spring constant, wherein the negative elasticity mechanism is composed of two types of negative elasticity sections, namely, main and auxiliary negative elasticity sections. Such a configuration may be capable of obtaining an arbitrary positive or negative spring constant. However, this configuration has a disadvantage that the configuration results in a complicated and upsized structure.

In addition, a toggle boost mechanism is also known conventionally. The toggle boost mechanism includes two links (a main link and an actuating link), a slider, and three shafts (a fixed main shaft serving as an axis of the two links; an unfixed movable shaft; and an actuating shaft in conjunction with the slider), and applies a predetermined input to the movable shaft in a direction perpendicular to the slider.

For such a toggle boost mechanism, an operating angle, which is an angle between the actuating link and the slider, is often set between 0 and 60 degrees. In particular, in an acute angle range of 25 degrees or less, the ratio of output to input increases sharply, resulting in a curved characteristic. Therefore, this mechanism is called a boost mechanism. On the other hand, when the angle exceeds 85°, the ratio of output to input decreases rapidly.

It may be possible to reduce a resultant operating force in magnitude by combining a toggle boost mechanism, which has a rapidly increasing curved characteristic, with a device having a linear characteristic based on a positive spring constant. However, this combination has a disadvantage that the operating force has a wide range of change due to the rapidly increasing curved characteristic.

The mechanism has gaps and backlash to allow operation. When a force becomes zero during operation, the direction of the force reverses, causing the operation to momentarily stagnate due to the gaps and backlash, resulting in characteristics of discontinuous operation.

When this mechanism is combined with a device having a linear characteristic based on a positive spring constant, there is a disadvantage that, due to the characteristics of discontinuous operation, an accurate output cannot be obtained in response to an instruction by operation, and high-precision control cannot be achieved.

For reasons as described above, it is an object to provide a reverse force mechanism to be combined with a device having a positive spring constant, wherein the reverse force mechanism has a simplified and downsized structure, and a reduced operating force suitable for high-speed operation, wherein the operating force has a non-zero value suitable for high-precision control.

PRIOR ART DOCUMENT(S)

Patent Document(s)

Patent Document 1: Japanese Patent No. 6774102

SUMMARY OF INVENTION

The present invention has been made in view of the problems with the conventional technology described above. According to one aspect of the present invention, a reverse force mechanism structured to be combined with a device having a positive spring constant, and adjust a resultant operating force by applying a reverse force to a point of application of force from the device with a negative spring constant, the reverse force mechanism includes: a main shaft supported at both ends thereof for rotation about an axis of the main shaft; a main link having a first end portion including a hole through which the main shaft is inserted, and a second end portion including a hole; a movable shaft inserted through the hole of the second end portion of the main link, and structured to travel in an arc trajectory centered on the main shaft and rotate about an axis of the movable shaft; an actuating link having a first end portion including a hole through which the movable shaft is inserted, and a second end portion including a hole; a slider extending perpendicular to the main shaft with both ends thereof fixed; an actuating shaft inserted through the hole of the second end portion of the actuating link, and structured to be guided by the slider to travel in a direction parallel to the slider and rotate about an axis of the actuating shaft; a spring link having a first end portion including a slot through which the movable shaft is inserted, and a second end portion including a hole; a spring shaft inserted through the hole of the second end portion of the spring link; and a reverse force spring attached to the spring link; wherein the spring shaft is fixed to a position a dimension away in a direction parallel to the slider from a base point on an extension of a line segment from the main shaft to the movable shaft when in an inserted state in which the movable shaft is farthest from a line connecting the main shaft and the actuating shaft; wherein the dimension is set such that the resultant operating force is constant at a non-zero value; and wherein an angle between the actuating link and the slider is set to be variable within a range of 25° to 85° during operation.

According to one aspect of the present invention, the reverse force mechanism is configured such that the reverse force spring is a compression spring disposed in a section of the spring link between the spring shaft and the movable shaft.

According to another aspect of the present invention, the reverse force mechanism is configured such that the second end portion of the spring link has an extension with respect the spring shaft; and wherein the reverse force spring is a tension spring disposed at the extension of the spring link.

According to a further aspect of the present invention, a reverse force mechanism structured to be combined with a device having a positive spring constant, and adjust a resultant operating force by applying a reverse force to a point of application of force from the device with a negative spring constant, the reverse force mechanism includes: a main shaft supported at both ends thereof for rotation about an axis of the main shaft; a main link having a first end portion including a hole through which the main shaft is inserted, and a second end portion including a hole; a movable shaft inserted through the hole of the second end portion of the main link, and structured to travel in an arc trajectory centered on the main shaft and rotate about an axis of the movable shaft; an actuating link having a first end portion including a hole through which the movable shaft is inserted, and a second end portion including a hole; a slider extending perpendicular to the main shaft with both ends thereof fixed; an actuating shaft inserted through the hole of the second end portion of the actuating link, and structured to be guided by the slider to travel in a direction parallel to the slider and rotate about an axis of the actuating shaft; a spring link having a first end portion including a slot through which the movable shaft is inserted, and a second end portion including a hole; a spring shaft inserted through the hole of the second end portion of the spring link; and a reverse force spring disposed in a section of the spring link between the spring shaft and the movable shaft; wherein the spring shaft is fixed between the main shaft and the movable shaft; and wherein an angle between the actuating link and the slider is set to be variable within a range of 25° to 85° during operation such that the resultant operating force is nonzero.

According to one aspect of the present invention, the reverse force mechanism is configured such that the device having the positive spring constant is a variable vacuum capacitor.

According to the present invention, it is possible to provide a reverse force mechanism to be combined with a device having a positive spring constant, wherein the reverse force mechanism has a simplified and downsized structure, and a reduced operating force suitable for high-speed operation, wherein the operating force has a non-zero value suitable for high-precision control.

MODE(S) FOR CARRYING OUT INVENTION

The following describes a reverse force mechanism according to an embodiment of the present invention in detail with reference to FIGS. 1 to 10.

Figure 1:
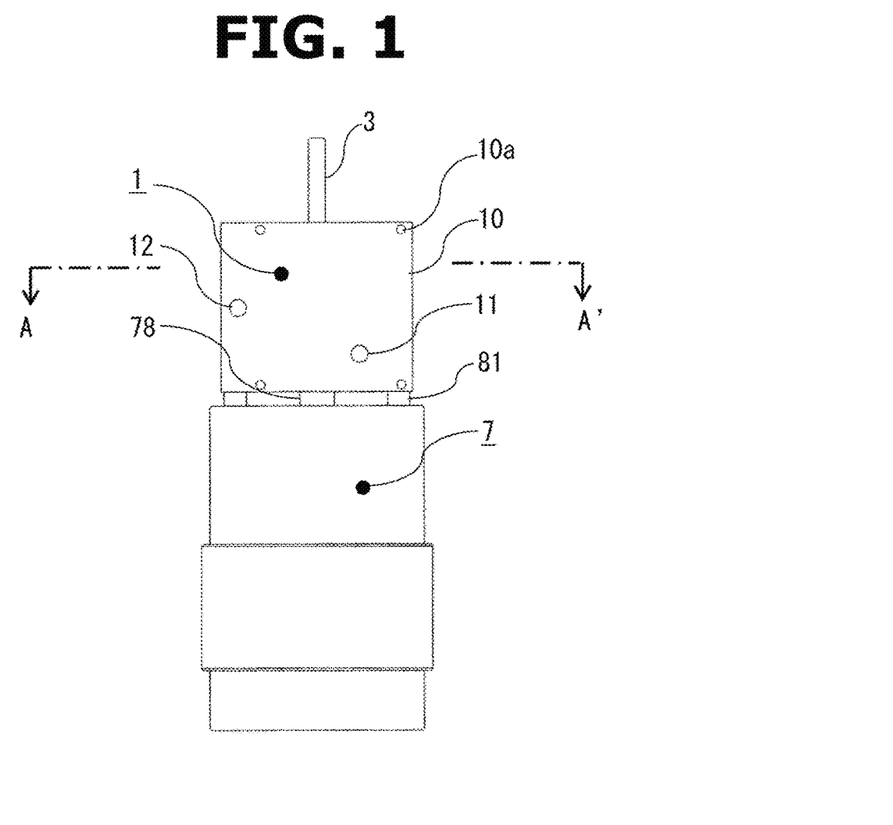
FIG. 1 is a front view showing a combination of a reverse force mechanism and a variable vacuum capacitor according to an embodiment.
Figure 2:
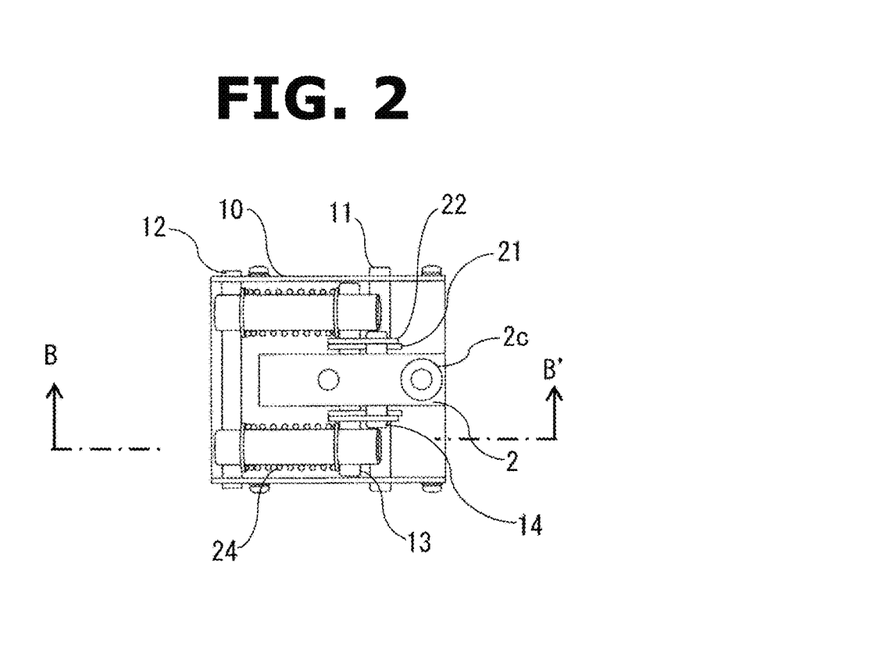
FIG. 2 is a cross-sectional view taken along a line A-A' in FIG. 1.
Figure 3:
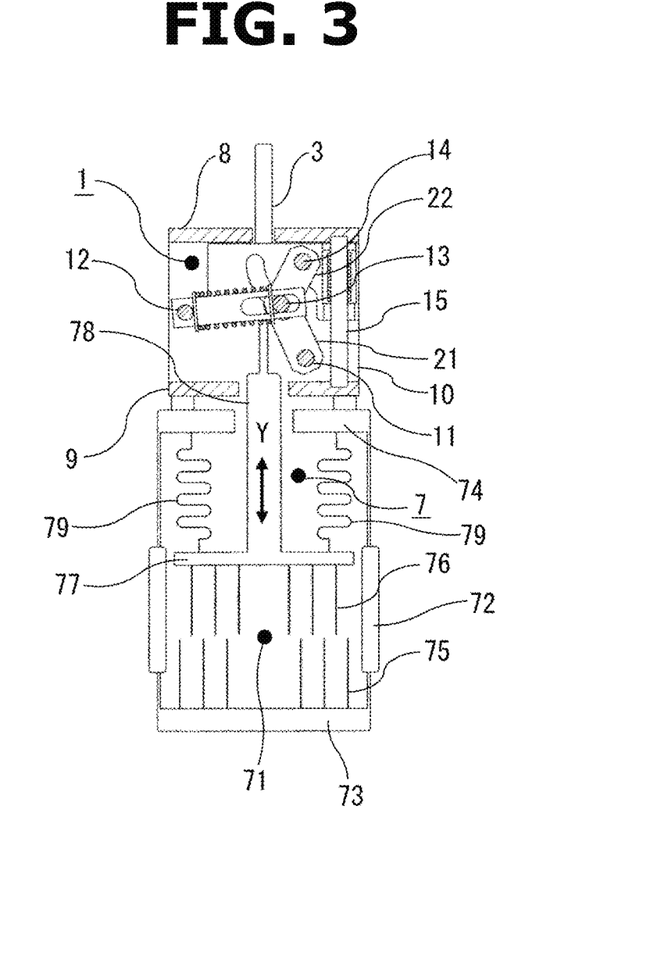
FIG. 3 is a cross-sectional view taken along a line B-B' in FIG. 2.

[Embodiment] FIG. 1 is a front view showing a combination of the reverse force mechanism and a variable vacuum capacitor according to the embodiment. FIG. 2 is a cross-sectional view taken along a line A-A' in FIG. 1. FIG. 3 is a cross-sectional view taken along a line B-B' in FIG. 2. As shown in FIGS. 1 to 3, the reverse force mechanism 1 is coupled with the variable vacuum capacitor 7 with a mounting fixture 81. The variable vacuum capacitor 7 is similar to that shown in FIG. 11. Hence, detailed description of the variable vacuum capacitor 7 is omitted here. The variable vacuum capacitor 7 has a positive spring constant with which an operating force is a positive pull-in force when the variable vacuum capacitor 7 is in a fully inserted state (a state in which a movable rod 78, a movable support part 77, and a movable electrode 76 are closest to a fixed-side conductor 73), wherein the pull-in force increases linearly as the variable vacuum capacitor 7 is extracted.

The reverse force mechanism 1 includes a pair of side plates 10, an upper plate 8, and a lower plate 9, wherein the upper plate 8 is fixed to an upper end portion of each side plate 10 by screws 10a, and the lower plate 9 is fixed to a lower end portion of each side plate 10 by screws 10a. A linear motion operating rod 3 projects from the upper plate 8. The linear motion operation rod 3 is supported by a drive source not shown. The movable rod 78 of the variable vacuum capacitor 7 passes through the lower plate 9 and is supported by the reverse force mechanism 1.

As shown in FIGS. 2 and 3, the reverse force mechanism 1 is a toggle mechanism that includes at least two links (a main link 21 and an actuating link 22), a slider 15, and three shafts (a main shaft 11, a movable shaft 13, and an actuating shaft 14).

Figure 4:
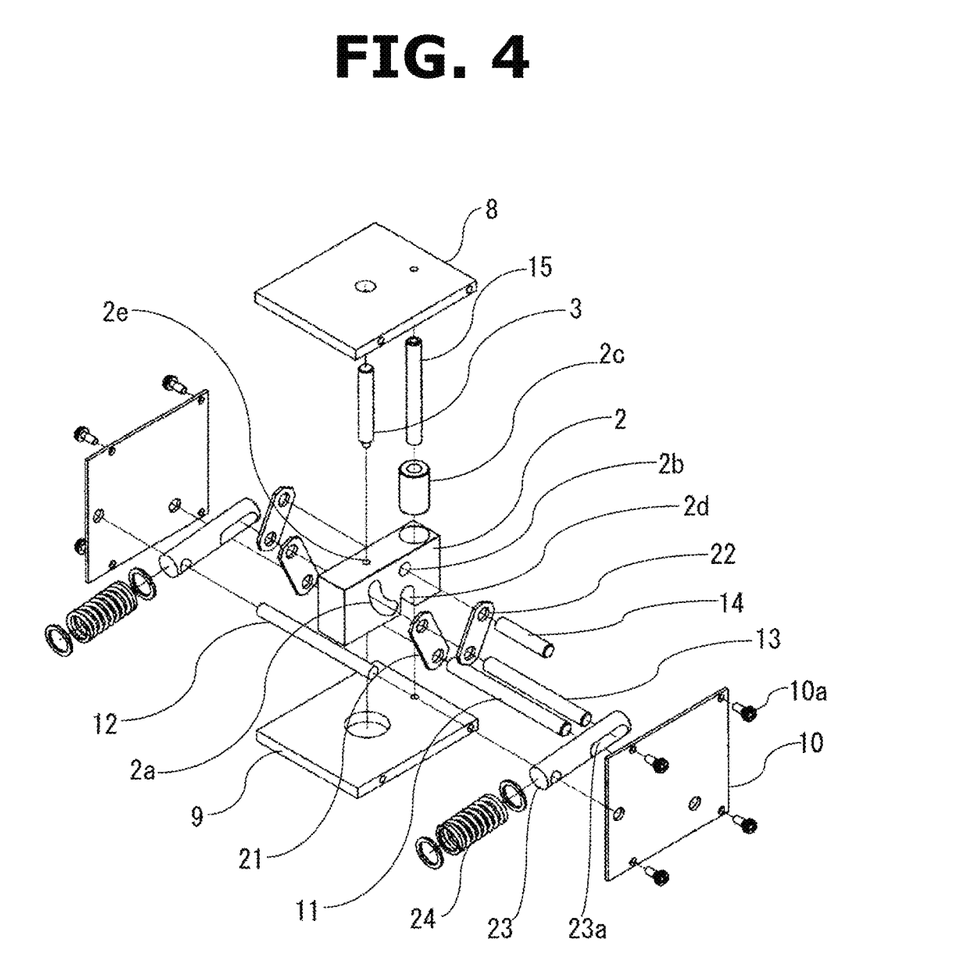
FIG. 4 is an exploded perspective view of the reverse force mechanism shown in FIG. 1.

As shown in FIG. 4, the main shaft 11 is supported at both ends thereof by the pair of side plates 10. The main shaft 11 is arranged perpendicular to the pair of side plates 10 and is inserted into holes of first end portions of a pair of plate-shaped main links 21 arranged inside the side plates 10. The main shaft 11 serves as an axis for two links, namely, the main link 21 and the actuating link 22, and is supported rotatably about the axis.

The movable shaft 13 is arranged inside the pair of side plates 10, perpendicular to the side plates 10, and rotatable about its axis. The movable shaft 13 is not fixed to the side plates 10. The movable shaft 13 is inserted through a slot 2a of a movable fitting 2 inside the main links 21 so as to prevent the movable shaft 13 and the movable fitting 2 from contacting each other during operation. Furthermore, the movable shaft 13 is inserted through a hole of a second end portion of each main link 21 outside the movable fitting 2 and through a hole of a first end portion of each plate-shaped actuating link 22. Furthermore, the movable shaft 13 is inserted into a slot 23a formed in a first end portion of a spring link 23 outside the actuating link 22, and is capable of traveling freely in the axial direction of the spring link 23. The movable shaft 13 is movable along a circular arc trajectory centered on the main shaft 11.

The actuating shaft 14 is arranged inside the pair of side plates 10, perpendicular to the side plates 10, and rotatable about its axis. The actuating shaft 14 is not fixed to the side plates 10. The actuating shaft 14 is inserted through a hole 2b of the movable fitting 2 and inserted through a hole of a second end portion of the actuating link 22 arranged outside the movable fitting 2.

The slider 15 has both ends fixed to the upper plate 8 and the lower plate 9 respectively and is arranged perpendicular to the upper plate 8 and the lower plate 9. Namely, the slider 15 extends in a direction perpendicular to the main shaft 11. The movable fitting 2 includes a linear bushing 2c fixed therein, wherein the slider 15 is inserted through an insertion hole of the linear bushing 2c. With this configuration, the slider 15 and the linear bushing 2c guide the actuating shaft 14 so that the actuating shaft 14 travels up and down on an imaginary slider line 15a shown in FIG. 7, wherein the imaginary slider line 15a is parallel to the slider 15. Namely, the actuating shaft 14 is movable in a direction parallel to the slider 15. The movable fitting 2 follows the actuating shaft 14.

The movable fitting 2 is formed with: a recess 2d to avoid contact with the main shaft 11; a hole 2e on the upper face for fixing the linear motion operating rod 3; and a fixing hole not shown on the lower face for fixing the movable rod 78.

The spring link 23 has a first end portion including the slot 23a through which the movable shaft 13 is inserted, and a second end portion including a hole through which a spring shaft 12 is inserted.

In this toggle mechanism, the center distance of the main link 21 between the main shaft 11 and the movable shaft 13 relates to an operating dimension S, characteristics of a curve of a force F1 acting on the movable shaft 13, and an angle θ3 between the actuating link 22 and the slider 15. Furthermore, the center distance of the actuating link 22 between the movable shaft 13 and the actuating shaft 14 relates to the operating dimension S, an angle θ1 between the spring link 23 and the actuating link 22, an angle θ2 between the spring link 23 and the main link 21, and the angle θ3 between the actuating link 22 and the slider 15. The operating dimension S is described below.

Here, an inserted state "a" is defined as a state in which the movable rod 78, the movable support part 77, and the movable electrode 76 are closest to the fixed-side conductor 73 in the variable vacuum capacitor 7. When in the inserted state "a", in the reverse force mechanism 1, the movable shaft 13 is farthest from a line connecting the main shaft 11 and the actuating shaft 14.

On the other hand, an extracted state "b" is defined as a state in which the movable rod 78, the movable support part 77, and the movable electrode 76 are farthest from the fixed-side conductor 73 in the variable vacuum capacitor 7. When in the extracted state "b", in the reverse force mechanism 1, the movable shaft 13 is closest to the line connecting the main shaft 11 and the actuating shaft 14.

The operating dimension S is defined as a distance of travel of the movable rod 78, the movable support part 77, and the movable electrode 76 of the variable vacuum capacitor 7 with respect to the inserted state "a". The operating dimension S is minimized when in the inserted state "a" and maximized when in the extracted state "b".

Figure 7:
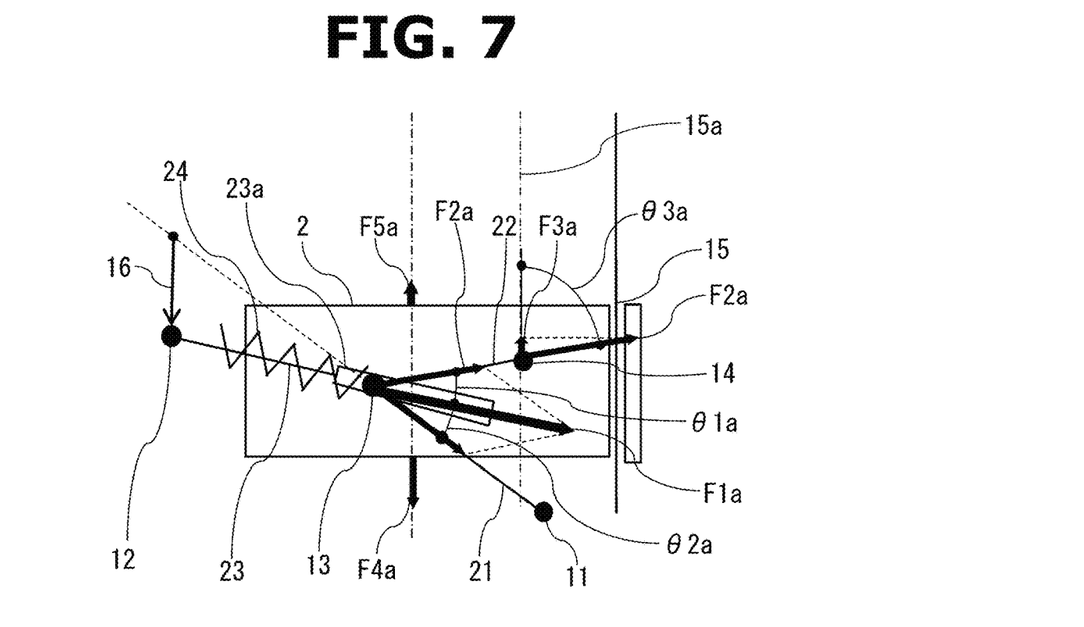
FIG. 7 is a force vector diagram for the reverse force mechanism when in the inserted state.

The spring shaft 12 is fixed at a position a dimension 16 shown in FIG. 7 away in a direction parallel to the slider 15 from a base point on an extension of a line segment from the main shaft 11 to the movable shaft 13 when in the inserted state "a" such that a reverse force spring 24 having a spring constant 24a can be inserted between the spring shaft 12 and the movable shaft 13. The dimension 16 is described below.

Figure 5:
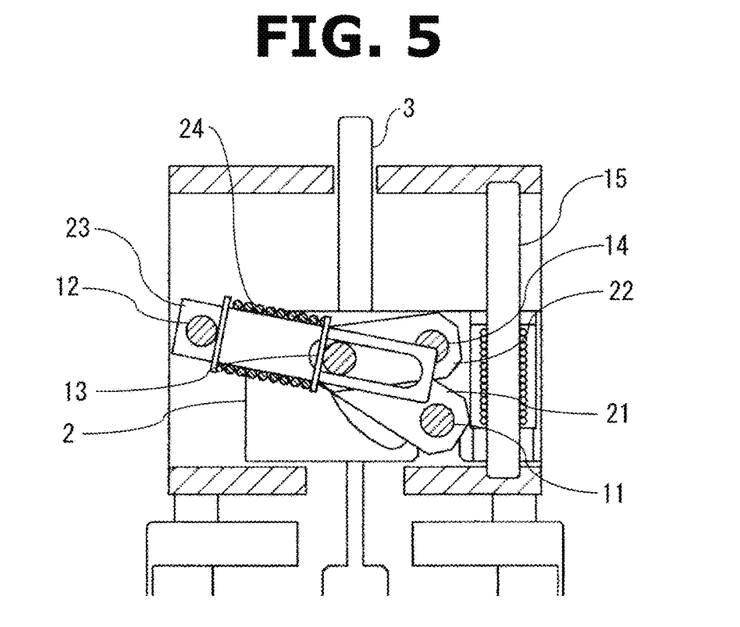
FIG. 5 is a cross-sectional view of the reverse force mechanism when in an inserted state.

When in the inserted state "a" shown in FIGS. 5 and 7, the movable shaft 13 of the reverse force mechanism 1 is in an initial position of an arcuate trajectory (in a lowermost and leftmost position of the arcuate trajectory), and the actuating shaft 14 is also in an initial position of sliding motion (in a lowermost position of a range of sliding motion). Since the movable shaft 13 is farthest from the line connecting the main shaft 11 and the actuating shaft 14, the distance between the spring shaft 12 and the movable shaft 13 is shortest so that the reverse force spring 24 applies a maximum force F1a to the movable shaft 13.

The positional relationship between the spring shaft 12 and the movable shaft 13 determines an angle $\theta 1a$ (about 18°) between the spring link 23 and the actuating link 22, and an angle $\theta 2a$ (about 21°) between the spring link 23 and the main link 21. The maximum force F1a acting on the movable shaft 13 is divided into a force F2a acting on the actuating shaft 14 via the actuating link 22 and a force acting on the main shaft 11 via the main link 21 in accordance with a ratio in angle between the angles $\theta 1a$ and $\theta 2a$.

Due to the positional relationship between the spring shaft 12 and the movable shaft 13, the angle $\theta 3a$ between the actuating link 22 and the imaginary slider line 15a is smaller than or equal to 85°. In the present embodiment, this angle $\theta 3a$ is equal to approximately 83° in FIG. 7. The reverse force F3a is the product of the cosine of the angle $\theta 3a$ and the force F2a applied to the actuating shaft 14. Since the cosine of the angle $\theta 3a$ (approximately 83°) is small, the reverse force F3a has a minimum value.

In the movable fitting 2, the difference between the reverse force F3a and the operating force F4a of the variable vacuum capacitor 7 is a resultant operating force F5a. The resultant operating force F5a has a positive value on the insertion side because the spring shaft 12 is fixed at the position the dimension 16 below the base point.

Figure 6:
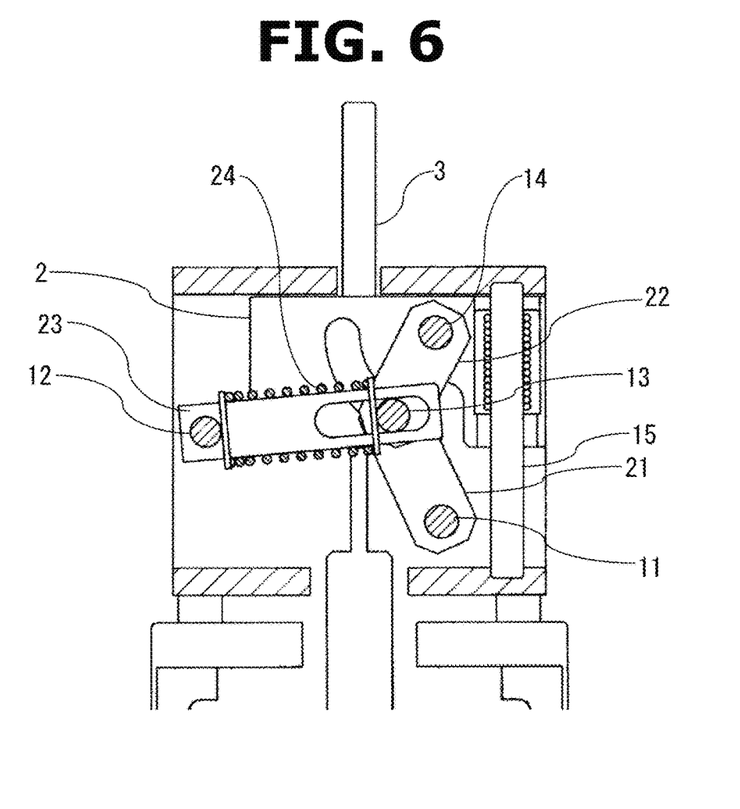
FIG. 6 is a cross-sectional view of the reverse force mechanism when in an extracted state.
Figure 8:
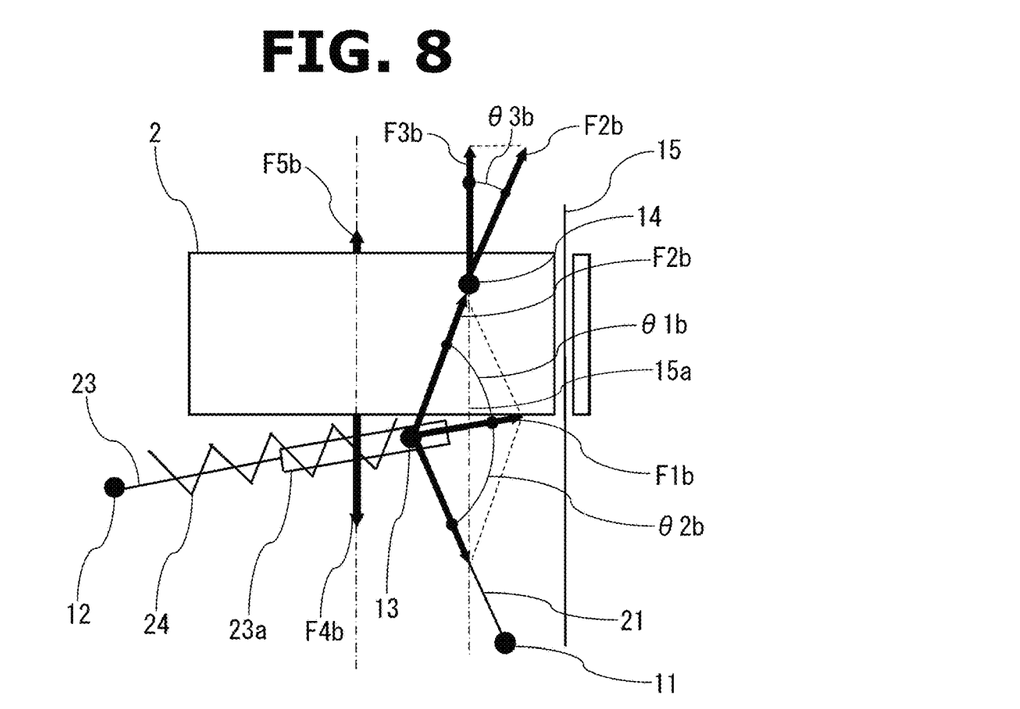
FIG. 8 is a force vector diagram for the reverse force mechanism when in the extracted state.

When in the extracted state "b" shown in FIGS. 6 and 8, the movable shaft 13 of the reverse force mechanism 1 is in a terminal position of the arcuate trajectory (an uppermost and rightmost position of the arcuate trajectory), and the actuating shaft 14 is also in a terminal position of sliding motion (in an uppermost position of the range of sliding motion).

Since the movable shaft 13 is closest to the line connecting the main shaft 11 and the actuating shaft 14, the distance between the spring shaft 12 and the movable shaft 13 is longest so that the reverse force spring 24 applies a minimum force F1b to the movable shaft 13.

The positional relationship between the spring shaft 12 and the movable shaft 13 determines an angle $61b$ (about 57°) between the spring link 23 and the actuating link 22, and an angle $\theta 2b$ (about 69°) between the spring link 23 and the main link 21. The minimum force F1b applied to the movable shaft 13 is divided into a force F2b applied to the actuating shaft 14 via the actuating link 22 and a force applied to the main shaft 11 via the main link 21 in accordance with a ratio in angle between the angles $\theta 1b$ and $\theta 2 b$.

Due to the positional relationship between the spring shaft 12 and the movable shaft 13, the angle $\theta 3b$ between the actuating link 22 and the imaginary slider line 15a is larger than 25°. In this embodiment, the angle $\theta 3b$ is equal to about 29° in FIG. 8. The reverse force F3b is the product of the cosine of the angle $\theta 3b$ and the force F2b applied to the actuating shaft 14. Since the cosine of the angle $\theta 3b$ (approximately 29°) has a large value, the reverse force F3b has a maximum value.

In the movable fitting 2, the difference between the reverse force F3b and the operating force F4b of the variable vacuum capacitor 7 is the resultant operating force F5b.

Figure 9:
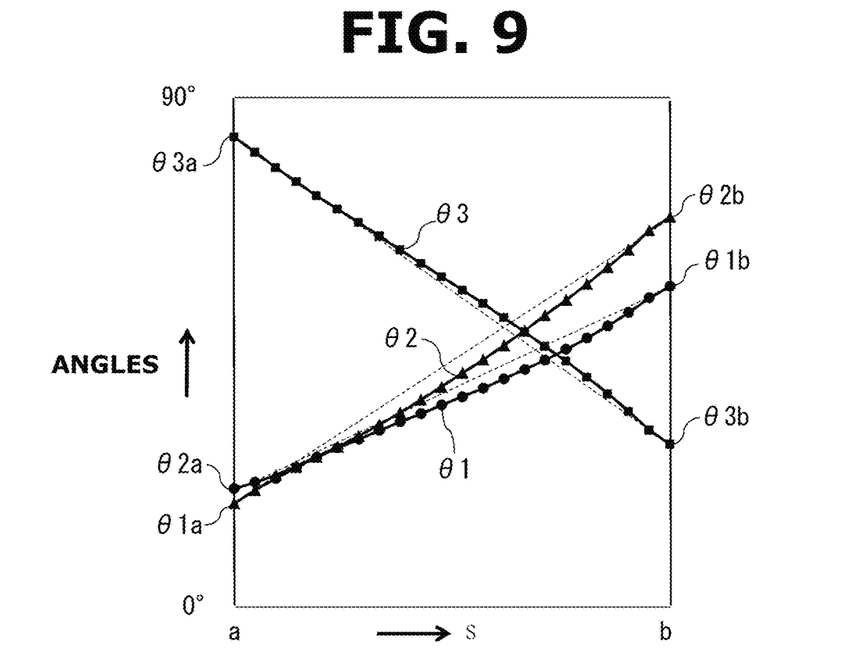
FIG. 9 is a graph showing characteristics of operating angles of the reverse force mechanism.
Figure 10:
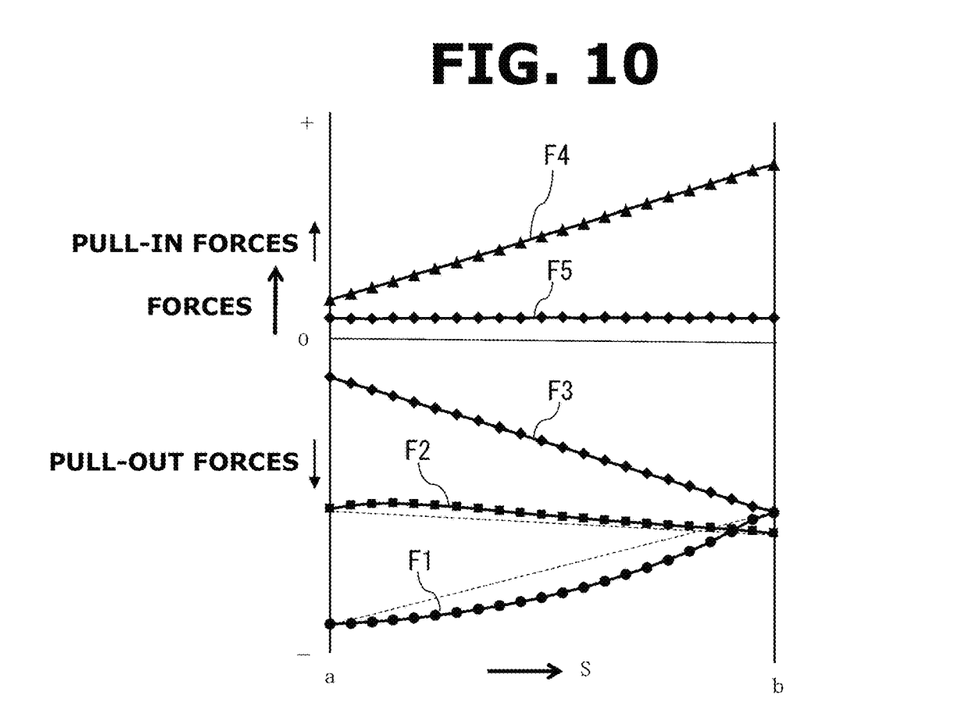
FIG. 10 is a graph showing characteristics of operating forces of the reverse force mechanism.

In FIG. 9, a horizontal axis indicates the operating dimension S between the inserted state "a" and the extracted state "b" of the variable vacuum capacitor 7, and a vertical axis indicates the angle $\theta 3$ (0° to 90°). In FIG. 10, a horizontal axis indicates the operating dimension S between the inserted state "a" and the extracted state "b" of the variable vacuum capacitor 7, and a vertical axis has a zero point at the center, and has a positive side indicating pull-in forces to the variable vacuum capacitor 7 and a negative side indicating pull-out forces of the variable vacuum capacitor 7. The pull-in forces and the pull-out forces become larger in magnitude as they move away from the zero point.

The force F1 applied to the movable shaft 13 generally changes linearly according to the operating dimension S due to the spring force of the reverse force spring 24 having the spring constant 24a. In this embodiment, however, the movable shaft 13 moves in the arcuate trajectory between the initial position of the inserted state "a" and the terminal position of the extracted state "b", so that the force F1 applied to the movable shaft 13 changes curvilinearly according to the operating dimension S. Specifically, the force F1 applied to the movable shaft 13 changes from the force F1a when in the inserted state "a" to the force F1b when in the extracted state "b" along a curve convex downward (in the direction in which pull-out forces increase), resulting in a curve characteristic in which the force F1 decreases from the inserted state "a" to the extracted state "b" as a whole.

As the movable shaft 13 moves in the arc trajectory, the angle $\theta 1$ between the spring link 23 and the actuating link 22 expands along a curve convex downward (in the direction of decreasing angle) from the angle $\theta 1a$ (approximately 18°) when in the inserted state "a" to the angle $\theta 1b$ (approximately 57°) when in the extracted state "b". Similarly, the angle $\theta 2$ between the spring link 23 and the main link 21 also expands along a curve convex downward (in the direction of decreasing angle) from the angle $\theta 2a$ when in the inserted state "a" to the angle $\theta 2b$ when in the extracted state "b".

Simultaneously, the proportion of angle $\theta 2$ becomes higher than that of the angle $\theta 1$, wherein the force F1 applied to the movable shaft 13 is distributed to the force F2 applied to the actuating shaft 14 and a force applied to the main shaft 11 depending on the proportion of angle $\theta 2$. The force F2 acting on the actuating shaft 14 changes along a curve slightly convex in a decreasing direction (a direction in which pulling forces decrease) from the inserted state "a" to the extracted state "b". As a whole, the force F2 has a characteristic of slowly increasing from the inserted state "a" to the extracted state "b".

In this way, the characteristic that the force F1 applied to the movable shaft 13 decreases from the inserted state "a" to the extracted state "b" with change in the angle ratio between the angle $\theta 1$ and the angle $\theta 2$ results in a characteristic (reverse force) that the force F2 applied to the actuating shaft 14 slowly increases. Thus, the direction of change of the force is reversed, resulting in a reverse force.

Depending on the fixed spring axis 12, the arcuate trajectory of the movable shaft 13, and the center distance of the actuating link 22, the angle θ3 between the actuating link 22 and the imaginary slider line 15a decreases almost linearly from the maximum angle θ3a (85° or less, approximately 83° in this embodiment) when in the inserted state "a" to an intermediate level, and then decreases along a curve convex slightly in the increasing direction (the direction of increasing angle) from the intermediate level to the minimum angle θ3b (exceeding 25°, approximately 29° in this embodiment) when in the extracted state "b".

The reverse force F3 is the product of the cosine of the angle θ3 and the force F2 applied to the actuating shaft 14. Accordingly, the characteristic that the force F2 applied to the actuating shaft 14 slowly increases along a curve convex slightly in the decreasing direction is corrected by multiplication by the cosine of the angle θ3 that changes along a curve convex slightly in the increasing direction. As a result, the reverse force F3 has a reverse force characteristic in which the pull-out force increases linearly from the reverse force F3a when in the inserted state "a" to the reverse force F3b when in the extracted state "b". The inclination of the reverse force F3 is increased by the force F2 applied to the actuating shaft 14.

In the movable fitting 2, the reverse force F3 and the operating force F4 of the variable vacuum capacitor 7 cancel each other to present the resultant operating force F5, resulting in a characteristic of operation that the operating force is constant without reversal of the direction during operation.

During shifting from the inserted state "a" to the extracted state "b", the movable shaft 13 of the main link 21 marks a circular arc locus. The dimension between the spring shaft 12 and the movable shaft 13 changes from the shortest when in the inserted state "a" to the longest when in the extracted state "b", while the force F1 applied to the movable shaft 13 by the force of the reverse force spring with the spring constant 24a decreases from the inserted state "a" to the extracted state "b".

The minimum spring force F1b (the force that the reverse force spring 24 applies to the movable shaft 13 when in the extracted state "b") affects the reverse force F3b applied to the actuating shaft 14, wherein the reverse force F3b affects the resultant operating force F5. The spring constant 24a of the reverse force spring 24 is adjusted so that the gradient (slope) of increase in the operating force F4 with respect to the operating dimension S of the device (variable vacuum capacitor 7) having a positive spring constant 1a matches the gradient (slope) of increase in the reverse force F3 of the actuating shaft 14 with respect to the operating dimension S. When the gradient of the operating force F4 of the variable vacuum capacitor 7 and the gradient of the reverse force F3 match each other, the resultant operating force F5 is constant.

According to patent document 1, as a reverse force mechanism to be combined with a device having a positive spring constant, the elastic mechanism is composed of two types of negative elastic sections, namely, main and auxiliary negative elastic sections, which generate a reverse force (a force with a negative spring constant) by resisting each other. In contrast, the present embodiment employs a mechanism that obtains a reverse force from a single type of negative elastic section by utilizing changes in forces in accordance with rotation angles of links.

In a toggle mechanism that utilizes changes in force in accordance with rotation angles of links, an output changes rapidly in response to an input when angle θ3 between actuating link 22 and slider 15 is at each end (each end of the range between 0° and 90°). However, when angle θ3 is in an intermediate section, the output is comparable to or less than the input, resulting in a characteristic of reverse force (a force with a negative spring constant). With attention to this characteristic, the angle θ3 between the actuating link 22 and the slider 15 is set to have a range of 25° to 85°, with the 25° angle side corresponding to the extracted state, maximum reverse force, and minimum input, and the other 85° angle side corresponding to the inserted state, minimum reverse force, and maximum input.

When in the inserted state "aa", fixation of the spring shaft 12 at a position on an extension of the line segment from the main shaft 11 to the movable shaft 13 causes the angle 62 between the spring link 23 and the main link 21 to be a straight line of 180° so that the force F1 applied to the movable shaft 13 by the reverse spring force is entirely applied to the main shaft 11 whereas the force F2 applied to the actuating shaft 14 becomes zero. When in the inserted state "aa", upward movement of the position where the spring shaft 12 is fixed reduces the force acting on the actuating shaft 14, whereas downward movement of the position where the spring shaft 12 is fixed increases the force acting on the actuating shaft 14. In this manner, the force F2 applied to the actuating shaft 14 is adjusted by adjusting the position where the spring shaft 12 is fixed.

The dimension 16 relates to the angle θ1 between the spring link 23 and the actuating link 22, the angle 62 between the spring link 23 and the main link 21, and the angle θ3 between the actuating link 22 and the slider 15. The spring shaft 12 is moved downward by the dimension 16 in the direction parallel to the slider 15 from the base point on the extension of the line segment from the main shaft 11 to the movable shaft 13 to adjust the reverse force F3 such that the resultant operating force F5, which is the difference between the operating force F4 of the variable vacuum capacitor 7 and the reverse force F3, becomes constant at a non-zero value. In other words, the dimension 16 is set such that the resultant operating force F5 is constant at a non-zero value.

The mechanism requires gaps and backlash to allow operation thereof. Accordingly, changes in forces during operation are estimated, and the resultant operating force F5 is set to a positive or negative value so as to prevent the resultant operating force F5 from becoming zero. In other words, the resultant operating force F5 is set to a non-zero value. This allows components of the mechanism to slide on specific surfaces constantly, and thereby eliminates the influence of the gaps and backlash to allow operation of the mechanism. This prevents momentary stagnation of operation and thereby prevents precision of operation from being adversely affected.

This reverse force mechanism 1 is combined with a device having a positive spring constant to adjust characteristics of the operating force. Then, by operating the linear motion operating rod 3 with a drive source not shown, the movable rod 78, the movable support part 77, and the movable electrode 76 are moved in the axial direction Y via the reverse force mechanism 1, thereby controlling the capacitance of the variable vacuum capacitor 7 to a desired value.

As described above, according to this embodiment, a reverse force mechanism to be combined with a device having a positive spring constant is composed of a single type of negative elastic section, resulting in a simplified and downsized structure.

Furthermore, by combining a reverse force mechanism with a device having a positive spring constant, it is possible to reduce the magnitude of an operating force so as to facilitate high-speed operation.

Furthermore, by setting the resultant operating force F5 to an increased non-zero value, it is possible to output an accurate response to an operation instruction, thereby enabling highly precise control.

Furthermore, by setting the angle θ3 between the actuating link 22 and the slider 15 in the range of 25° to 85°, it is possible to achieve a reverse force characteristic with an output being comparable to or less than an input.

Furthermore, by adjusting the position where the spring shaft 12 is fixed, it is possible to arbitrarily set the force applied to the actuating shaft 14 and the resultant operating force F5, thereby obtaining a linear reverse force characteristic.

Furthermore, by matching the gradient of the reverse force F3 with the gradient of the operating force F4 of the variable vacuum capacitor 7, it is possible to set the resultant operating force F5 to be constant.

[Other Embodiments] In the present embodiment, the reverse force spring 24 attached to the spring link 23 is implemented by a compression spring. However, the reverse force spring 24 may be implemented by a tension spring, wherein the spring link 23 is formed to have an extension extending from the spring shaft 12 away from the movable shaft 13, and the tension spring is arranged at the extension of the spring link 23 (on the second end side of the spring link 23 with respect to the spring axis 12).

Furthermore, when in the inserted state "a" where the movable shaft 13 is farthest from the line connecting the main shaft 11 and the actuating shaft 14, the spring shaft 12 may be fixed on the opposite side of the extension of the line segment from the main shaft 11 to the movable shaft 13 in the main link 21, namely, may be fixed between the main shaft 11 and the movable shaft 13 of the main link 21. In this case, however, the angle θ1 between the spring link 23 and the actuating link 22, the angle θ2 between the spring link 23 and the main link 21, and the angle θ3 between the actuating link 22 and the slider 15 change, so that it is impossible to make corrections such as multiplication by the cosine of the angle θ3, and make the output of the reverse force mechanism to be linear. Therefore, the resultant operating force F5 cannot be set to a constant value. However, it is possible to set the resultant operating force F5 to be other than zero.

Although the present invention has been described in detail only with respect to the specific embodiment, it is apparent to those skilled in the art that various modifications and variations are possible within the scope of the technical concept of the present invention, and it is natural that such modifications and variations fall within the scope of the patent claims.

The invention claimed is:

1. A reverse force mechanism structured to be combined with a device having a positive spring constant, and adjust a resultant operating force by applying a reverse force to a point of application of force from the device with a negative spring constant, the reverse force mechanism comprising:
    a main shaft supported at both ends thereof for rotation about an axis of the main shaft;
    a main link having a first end portion including a hole through which the main shaft is inserted, and a second end portion including a hole;
    a movable shaft inserted through the hole of the second end portion of the main link, and structured to travel in an arc trajectory centered on the main shaft and rotate about an axis of the movable shaft;
    an actuating link having a first end portion including a hole through which the movable shaft is inserted, and a second end portion including a hole;
    a slider extending perpendicular to the main shaft with both ends thereof fixed;
    an actuating shaft inserted through the hole of the second end portion of the actuating link, and structured to be guided by the slider to travel in a direction parallel to the slider and rotate about an axis of the actuating shaft;
    a spring link having a first end portion including a slot through which the movable shaft is inserted, and a second end portion including a hole;
    a spring shaft inserted through the hole of the second end portion of the spring link; and
    a reverse force spring attached to the spring link;
    wherein the spring shaft is fixed to a position a dimension away in a direction parallel to the slider from a base point on an extension of a line segment from the main shaft to the movable shaft when in an inserted state in which the movable shaft is farthest from a line connecting the main shaft and the actuating shaft;
    wherein the dimension is set such that the resultant operating force is constant at a non-zero value; and
    wherein an angle between the actuating link and the slider is set to be variable within a range of 25° to 85° during operation.

2. The reverse force mechanism as claimed in claim 1, wherein the reverse force spring is a compression spring disposed in a section of the spring link between the spring shaft and the movable shaft.

3. The reverse force mechanism as claimed in claim 1, wherein the second end portion of the spring link has an extension with respect the spring shaft; and
    wherein the reverse force spring is a tension spring disposed at the extension of the spring link.

4. A reverse force mechanism structured to be combined with a device having a positive spring constant, and adjust a resultant operating force by applying a reverse force to a point of application of force from the device with a negative spring constant, the reverse force mechanism comprising:
    a main shaft supported at both ends thereof for rotation about an axis of the main shaft;
    a main link having a first end portion including a hole through which the main shaft is inserted, and a second end portion including a hole;
    a movable shaft inserted through the hole of the second end portion of the main link, and structured to travel in an arc trajectory centered on the main shaft and rotate about an axis of the movable shaft;
    an actuating link having a first end portion including a hole through which the movable shaft is inserted, and a second end portion including a hole;
    a slider extending perpendicular to the main shaft with both ends thereof fixed;
    an actuating shaft inserted through the hole of the second end portion of the actuating link, and structured to be guided by the slider to travel in a direction parallel to the slider and rotate about an axis of the actuating shaft;
    a spring link having a first end portion including a slot through which the movable shaft is inserted, and a second end portion including a hole;
    a spring shaft inserted through the hole of the second end portion of the spring link; and
    a reverse force spring disposed in a section of the spring link between the spring shaft and the movable shaft;

wherein the spring shaft is fixed between the main shaft and the movable shaft; and wherein an angle between the actuating link and the slider is set to be variable within a range of 25° to 85° during operation such that the resultant operating force is nonzero.

5. The reverse force mechanism as claimed in claim 1, wherein the device having the positive spring constant is a variable vacuum capacitor.

6. The reverse force mechanism as claimed in claim 4, wherein the device having the positive spring constant is a variable vacuum capacitor.

* * * * *